United States Patent
Araújo

(10) Patent No.: US 9,569,318 B2
(45) Date of Patent: Feb. 14, 2017

(54) FAILOVER HANDLING IN A CONTENT NODE OF A CONTENT DELIVERY NETWORK

(71) Applicant: Fastly, Inc., San Francisco, CA (US)

(72) Inventor: João Diogo Taveira Araújo, Porto (PT)

(73) Assignee: Fastly, Inc., San Francisco, CA (US)

( * ) Notice: Subject to any disclaimer, the term of this patent is extended or adjusted under 35 U.S.C. 154(b) by 228 days.

(21) Appl. No.: 14/291,318

(22) Filed: May 30, 2014

(65) Prior Publication Data

US 2015/0347249 A1    Dec. 3, 2015

(51) Int. Cl.

| G06F 11/00 | (2006.01) |
|---|---|
| G06F 11/20 | (2006.01) |
| H04L 7/00 | (2006.01) |
| H04L 12/741 | (2013.01) |
| H04L 29/08 | (2006.01) |
| H04L 29/12 | (2006.01) |

(52) U.S. Cl.
CPC ........ G06F 11/2023 (2013.01); G06F 11/2025 (2013.01); G06F 11/2041 (2013.01); H04L 7/0079 (2013.01); H04L 45/745 (2013.01); H04L 67/10 (2013.01); H04L 61/103 (2013.01); H04L 61/6022 (2013.01)

(58) Field of Classification Search
CPC .............. G06F 11/1423; G06F 11/1425; G06F 11/2023; H04L 67/1034; H04L 67/1044
USPC ........................................................ 714/4.11
See application file for complete search history.

(56) References Cited

U.S. PATENT DOCUMENTS

| 6,081,586 | A | 6/2000 | Rahamim et al. | |
|---|---|---|---|---|
| 6,182,139 | B1* | 1/2001 | Brendel | H04L 29/06 709/201 |
| 8,078,755 | B1 | 12/2011 | Liu et al. | |
| 8,341,295 | B1* | 12/2012 | Liu | G06Q 20/401 709/203 |
| 2001/0056490 | A1 | 12/2001 | Nagami et al. | |
| 2003/0174648 | A1* | 9/2003 | Wang | H04L 65/1013 370/235 |
| 2010/0318665 | A1* | 12/2010 | Demmer | H04L 41/12 709/227 |
| 2011/0225311 | A1 | 9/2011 | Liu et al. | |
| 2011/0231515 | A1* | 9/2011 | Day | G06Q 20/401 709/217 |
| 2012/0113901 | A1* | 5/2012 | Jackson | H04W 4/22 370/328 |

(Continued)

*Primary Examiner* — Elmira Mehrmanesh

(57) ABSTRACT

Described herein are methods, systems, and software for accommodating failover of a content node in a content delivery network. In one example, a method of operating a content node includes receiving a communication for an end user device from a control node, wherein an interrupted content node previously handled the communication. The method further includes determining if the communication includes a synchronization packet and identifying connection information for the communication. The method also provides, if the communication includes a synchronization packet, accepting the communication and handling delivery for the end user device. The method also includes, if the communication does not include the synchronization packet, determining if a match exists between the connection information for the communication and connection information stored in a flow table, and handling the communication based on the match.

20 Claims, 11 Drawing Sheets

(56) References Cited

U.S. PATENT DOCUMENTS

2013/0163598 A1 6/2013 Jacobson et al.
2013/0304892 A1* 11/2013 Afergan .................. H04L 69/16
                                                              709/223

\* cited by examiner

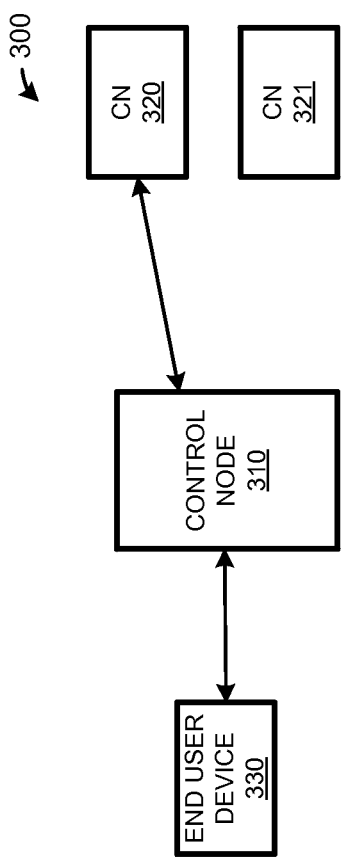
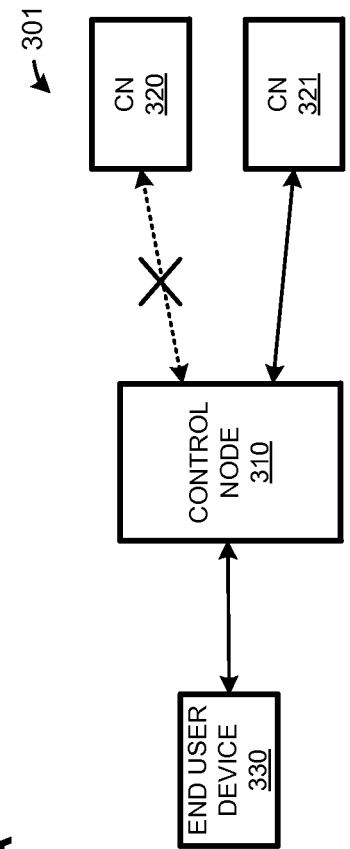
FIGURE 3A
FIGURE 3B

| FLOW TABLE 800 | | | | |
|---|---|---|---|---|
| SOURCE ADDRESS 810 | DESTINATION ADDRESS 820 | SOURCE PORT 830 | DESTINATION PORT 840 | OTHER INFORMATION 850 |
| . . . . . . . | . . . . . . . | . . . . . . . | . . . . . . . | . . . . . . . |

FIGURE 8

FAILOVER HANDLING IN A CONTENT NODE OF A CONTENT DELIVERY NETWORK

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include hosting servers, which host network content of content creators or originators, such as web servers for hosting a news website. However, these originating computer systems can become overloaded and slow due to frequent requests of content by end users.

To assist the origin servers, content delivery networks have been developed that create a layer of caching between the origin servers and the end users. These content delivery networks typically have one or more content nodes, or cache nodes, distributed across a large geographic region to provide faster and lower latency access to the content for the end users. In operation, content from the origin servers can be cached into the content nodes, and can be requested via the content nodes from the origin server when the content has not yet been cached.

In some examples, multiple content nodes may be grouped in one physical location to provide content to end user devices. These locations, or points of presence, may include highly populated cities, central data request locations, or any other geographic location that may require multiple content nodes. These content nodes can individually serve content to end users during associated communication sessions. However, when a particular content node experiences a service interruption or failure, any associated communication sessions can lead to content delivery interruptions to end users.

OVERVIEW

Methods, systems, and software are included for providing data to users during content node failures. In one example, a method of operating a content node includes receiving a communication for an end user device from a control node, wherein an interrupted content node previously handled the communication. The method further includes determining if the communication includes a synchronization packet and identifying connection information for the communication. The method also provides, if the communication includes a synchronization packet, accepting the communication and handling delivery for the end user device. The method also includes, if the communication does not include the synchronization packet, determining if a match exists between the connection information for the communication and connection information stored in a flow table, and handling the communication based on the match.

In a further instance, a computer apparatus to operate a content node in a content delivery network includes processing instructions that direct the content node to receive a communication from a control node, the communication corresponding to a content request issued by an end user device previously handled by the interrupted content node. The processing instructions also direct the content node to determine if the communication includes a synchronization packet and identify connection information for the communication. The processing instructions further direct the content node to, if the communication includes the synchronization packet, accept the communication, add the connection information for the communication to a flow table, and handle content delivery for the end user device instead of the interrupted content node based at least on the flow table. The processing instructions also direct the content node to, if the communication does not include the synchronization packet, determine if a match exists between the connection information for the communication and connection information stored in the flow table, and handling the communication based on the match. The computer apparatus also includes one or more non-transitory computer readable media that store the processing instructions.

In another example, a content delivery network to transition communications to a content node from an interrupted content node includes a control node configured to transfer a communication to a content node, the communication corresponding to a content request issued by an end user device previously handled by the interrupted content node. The system further includes the content node configured to receive the communication and determine if the communication includes a synchronization packet and identify connection information for the communication. The content node is further configured to, if the communication includes the synchronization packet, accept the communication, add the connection information for the communication to a flow table, and handle content delivery for the end user device instead of the interrupted content node based at least on the flow table. The content node is also configured to, if the communication does not include the synchronization packet, determine if a match exists between the connection information for the communication and connection information stored in the flow table, and handling the communication based on the match.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 3A illustrates an operational scenario for operating a control node during a content node interruption.

FIG. 3B illustrates an operational scenario for operating a control node during a content node interruption.

FIG. 8 illustrates a flow table for an alternative content node.

DESCRIPTION

Figure 1:
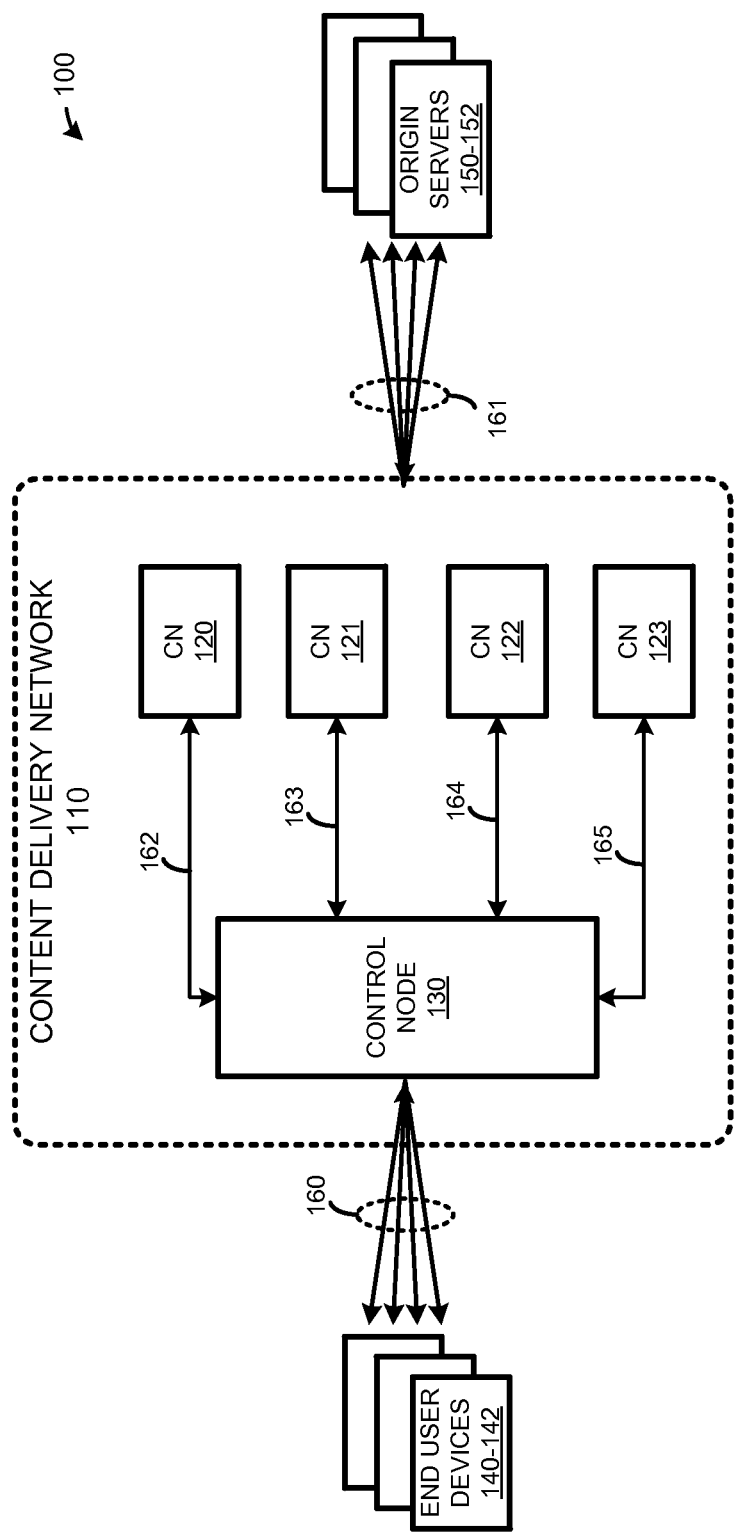
FIG. 1 illustrates a communication system for providing content to end user devices via a control node.

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. However, when a content delivery network is employed, the content delivery network can act as a proxy to cache content delivery between origin servers and the end user devices.

Content delivery networks can add a layer of caching between origin servers of the content providers and the end users. The content delivery networks typically have one or more content nodes (CNs), or cache nodes, distributed across a large geographic region to provide faster and lower latency local access to the content for the end users. When end users request content, such as a web page, a locally proximate CN will respond to the content request instead of the associated origin server. Various techniques can be employed to ensure the CN responds to content requests instead of the origin servers, such as associating web content of the origin servers with network addresses of the CNs.

In many examples, multiple network content sources are handled by a single CN. For example, a CN can be configured to cache website content of many different websites of many different website content originators. A CN may further only cache portions of the original content source to provide the most frequently accessed content to the end user devices. As a result, content and data objects that are stored on the CN may need to be purged and updated to reflect changes in the source content, to reflect changes in the requests from the end user devices, or for a variety of other purposes.

In some examples, a plurality of CNs may be situated at a common site in densely trafficked request areas, such as cities, to provide content to the end users without being burdened by the number of requests. To handle the incoming data requests, each CN may communicate with a control node or switch that directs each of the requests to the various CNs. This control node may, in some examples, include a load-balancing module, such as an equal-cost multi-path (ECMP) module, that is used to balance the requests amongst the various CNs that are connected in the system.

Although the control node initially is configured to spread the data requests amongst all of the nodes that are connected in the system, a control node may be interrupted in some examples. This interruption may occur when a CN itself is unable to respond to data requests, when the communication path between the control node and the CN is interrupted, when an administrator or some other management process initiates an interruption with the node, or any other possible interruption. When this interruption occurs between the control node and the CN, the control node is configured to identify the existence of the issue and initiate the transition or drain of communications from the CN to one or more alternative CNs.

To further illustrate the transition from an interrupted CN, FIG. 1 is included. FIG. 1 illustrates a communication system 100 for providing content to end user devices via a control node. Communication system 100 includes content delivery network 110, end user devices 140-142, and origin servers 150-152. Content delivery network 110 further includes control node 130 and content nodes (CNs) 120-123. End user devices 140-142 communicate with control node 130 over communication links 160. Origin servers 150-152 provide data to CNs 120-123 over communication links 161. Control node 130 communicates with CNs 120-123 over communication links 162-165.

In operation, CNs 120-123 cache content provided by origin servers 150-152. This cached content may include web pages, pictures, movies, or any other similar content that may be requested by end user devices 140-142. In some instances, CNs 120-123 may only cache a portion of the total content that is available on origin servers 150-152, such as the most recently accessed or most popular data for the end users. Accordingly, if an end user device requests content that is not available on CNs 120-123, the content may be retrieved from the proper origin server and supplied to the end user. Further, once the data is retrieved, the data may be cached in one of CNs 120-123 to be supplied in future requests.

In the present example, CNs 120-123 communicate with end user devices 140-142 using control node 130. Control node 130 is configured to direct and spread content requests from the end user devices amongst the available CNs. Accordingly, control node 130 may act as a load balancer to ensure that each of CNs 120-123 is not inundated or overloaded with data requests from the end users. For example, a first data request by end user device 140 may be directed by control node 130 to CN 120, whereas the next request from end user device 141 may be directed to CN 122.

In addition to providing load balancing and directing the communications for CNs 120-123, control node 130 also detects interruptions or failures of the various CNs. To detect interruptions, control node 130 may query or periodically receive updates from CNs 120-123 to identify if CN has failed or the communication path is interrupted. If communications are interrupted, control node 130 may direct communications that initiated with the failed CN to one or more other CNs. To accomplish this task, control node 130 may include virtual next hop network addresses that direct each of the communications to the appropriate CN of CNs 120-123. These virtual next hop network addresses may comprise virtual Internet Protocol (IP) address that might not correspond to physical interfaces or physical network nodes, but are rather associated to special media access control (MAC) or link layer addresses that are configured by the control node to communicate with each of the CNs. These MAC addresses may be used to define the proper CN to process a content request, but may also be used to identify the origin of the request. For example a first MAC address could be used by a CN to identify communications that are intended for that node, however, a second MAC address could be used by a CN to identify communications that were intended for another CN.

Figure 2:
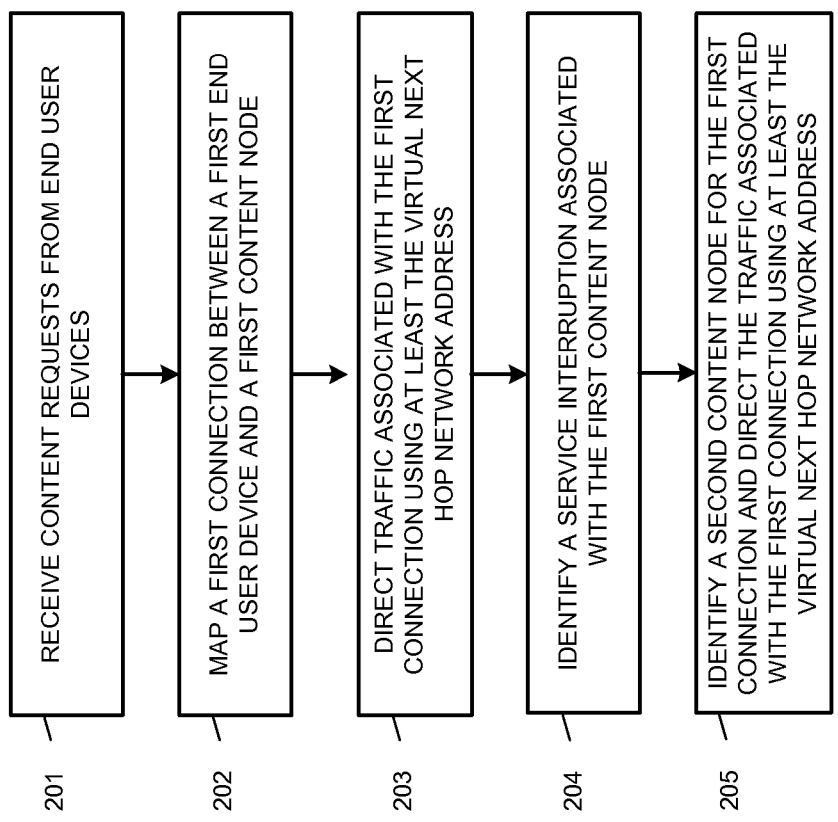
FIG. 2 illustrates the operation of a control node during a content node interruption.

To further illustrate the directing of CN communications upon a CN interruption, FIG. 2 is provided. FIG. 2 illustrates the operation of a control node during a content node interruption. The operations of FIG. 2 are referenced parenthetically below.

In operation, a control node receives content requests issued by end user devices for content cached by a plurality of CNs of a content delivery network (201). For at least a first content request, the control node maps a first connection between a first end user device and a first CN, wherein the first connection is defined by at least a network address of the first end user device and virtual next hop network address (202). In some examples the network address and the virtual next hop network address comprise IP addresses that are used to set up the communication. Once the mapping is complete, the control node directs traffic associated with the first connection to the first CN using at least the virtual next hop network address (203). For example, an end user device may require content served from one of the content delivery nodes. As a result of this requirement, the end user device contacts the control node using a common network address that is used for all of the content delivery nodes communicatively coupled to the control node. In response to receiving the request, the control node identifies a virtual next hop address for the communication using a distributed algorithm to spread the content requests amongst the available CNs. Once a virtual next hop network address is identified, the next hop network address is matched to an initial MAC or link layer address for the particular node, and the request is passed to the particular node.

Continuing with FIG. 2, the control node identifies a service interruption associated with the first CN (204). This service interruption may occur as a result of an issue in the communication link, an issue in the CN itself, a planned interruption for maintenance by an administrator or management process, or for any other related problem with the CN. Once an issue is identified, the control node identifies a second CN to handle the first connection and directs the traffic associated with the first connection the second CN using at least the virtual next hop address (205).

Referring to FIG. 1 as an example, a communication between an end user device and CN 120 may be interrupted, preventing the end user device from accessing content from CN 120. Responsive to the interruption, control node 130 maps the virtual next hop network address for the communication to an alternative CN, such as CN 121. For instance, the virtual next hop network address may initially be mapped to MAC address 1.1. Responsive to the interruption, the virtual next hop network address may be mapped to MAC address 1.2 that corresponds to CN 121. Thus, communications are no longer passed between the end user device and CN 120.

In some examples, the MAC addresses used to contact each of the CNs may include various encoded information that can be used to by the CNs to identify characteristics of the communication. Such encoded information may include an identity for the previous CN (if any) used in the communication, the identity of the current CN, the type of traffic for the communication, the network interface for the current CN, whether the communication is being drained or transferred from another node, or any other similar information.

Referring now to FIGS. 3A and 3B, FIGS. 3A and 3B illustrate operational scenarios 300-301 for operating a control node during a content node interruption. Operational scenarios 300-301 include control node 310, content nodes (CNs) 320-321, and end user device 330.

In operation, control node 310 and CNs 320-321 may exist within a content delivery network to provide various types of content to end user devices. As depicted in the present example, end user device 330 communicates with control node 310 to request content from the various content delivery nodes. In some instances, control node 310 may possess a network address that is shared by all CNs that are communicatively coupled to control node 310. As a result, rather than contacting each of the CNs directly, the end user devices contact control node 310 initially to request content. Responsive to a request by end user device 330, control node 310 uses a balancing process or algorithm to determine virtual next hop network address for a CN to handle the request. Once the process defines the virtual next hop network address, the address is matched, using an Address Resolution Protocol (ARP) protocol table, to a MAC address for the destination CN. In the present example, control node 310 matches the next hop network address to a MAC address for CN 320 and CN 320 responsively initiates communication with end user device 330 over control node 310.

Although CN 320 ideally handles the entire communication for control node 310, the communication between control node 310 and CN 320 may be interrupted. Accordingly, as illustrated in operational scenario 301, when a service interruption is identified, control node 310 identifies an alternative CN 321 to handle the communication with end user device 330. To accomplish this task, the ARP table that maps the virtual next hop network addresses to MAC addresses may be modified. Thus, instead of mapping to CN 320, the virtual next hop address may map to a new MAC address associated with CN 321, allowing the communication to continue using the alternative CN.

Figure 4:
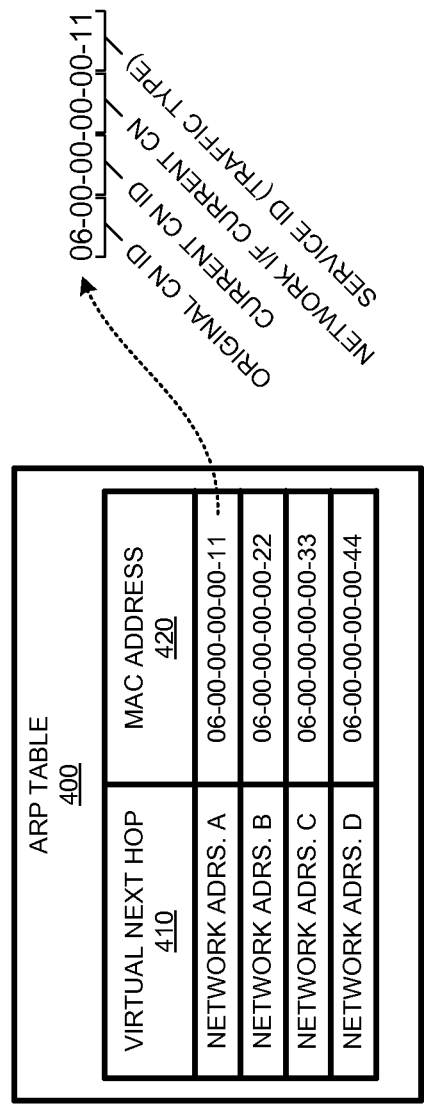
FIG. 4 illustrates an Address Resolution Protocol table for directing communications on a control node.

As a further illustration of mapping end user devices to content nodes, FIG. 4 is included. FIG. 4 illustrates an Address Resolution Protocol (ARP) table 400 for directing communications to a content node. ARP table 400 includes virtual next hop network addresses 410 and MAC addresses 420. ARP table 400 is an example table for directing communications for an end user device to one or more CNs connected to the control node. Although illustrated with MAC addresses in the present example, it should be understood that any link layer technology may be used in routing or directing the communications, and should not be limited to the Ethernet protocols.

In operation, a control node distributes content requests from end user devices to various CNs. To accomplish this task, the control node is configured with one or more IP addresses to handle content requests to the CNs. Once requests are received using the one or more IP addresses, the control node disperses the requests amongst the available CNs using an ECMP module or some other balancing process that balances the load amongst the available nodes. In some examples, such as that displayed in FIG. 4, the balancing process may select a virtual next hop network address in virtual next hop network addresses 410. Once a next hop is selected the communication mapped using the address, ARP table 400 is used to associate the next hop to a MAC address in MAC addresses 420 to handle the content request. For instance, a content request may be received by a control node and may be directed to virtual next hop network address A in virtual next hop network addresses 410. Once the next hop is identified, the content request may be forwarded to the CN corresponding to MAC address 06-00-00-00-00-11 in MAC addresses 420.

Although not illustrated in the present example, the CNs linked by MAC addresses 420 may become unavailable or service may be interrupted between the control node and one or more of the CNs. Accordingly, when this occurs, the MAC addresses 420 in ARP table 400 may be modified to change the destination CN for a communication. For example, an original communication may use 06-00-00-00-00-11, but when the CN becomes unavailable, the address may change to 06-00-00-00-00-21, not illustrated, which corresponds to an alternative CN.

In some examples, the MAC addresses supplied in ARP table 400 may contain encoded information regarding the content requests. Such information may include the identity of the original CN, the identity of the current CN, the network interface for the current CN, the type of traffic for the communication, or any other similar information. In some instances, to encode the information in a MAC address, certain digits may be given to identify the original CN, certain digits may be used to identify the other CN, and the other digits may be space fillers or contain further encoded information about the communication.

Figure 5:
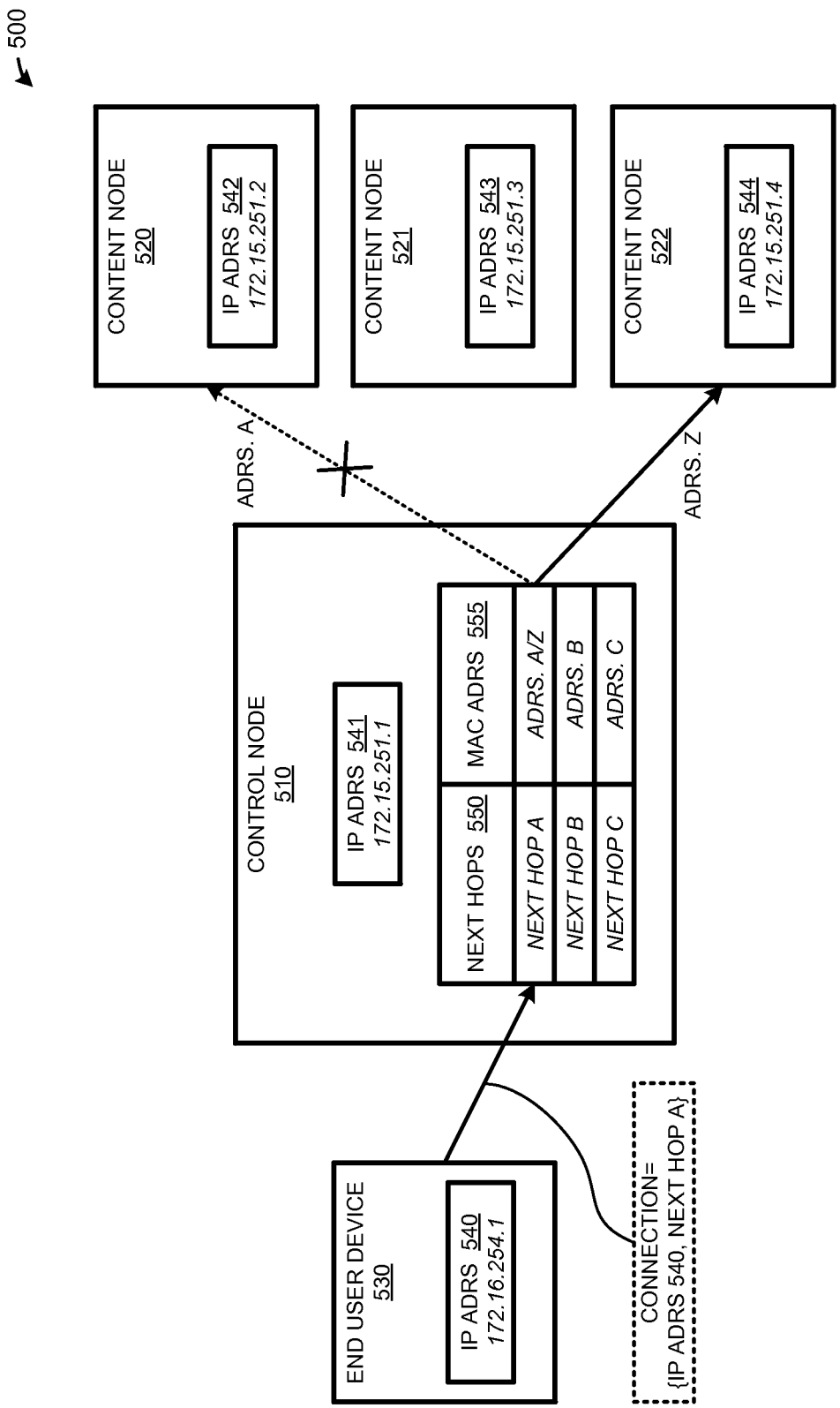
FIG. 5 illustrates an overview for directing content communications during a content node interruption.

To further illustrate the transition to an alternative content delivery node, FIG. 5 is provided. FIG. 5 illustrates an overview 500 for directing content communications during a content node interruption. Overview 500 includes control node 510, content nodes (CNs) 520-522, and end user device 530. Control node 510, CNs 520-522, and end user device 530 each correspond to different IP address 540-544. Control node 510 further includes next hops 550 and MAC addresses 555.

In operation, end user device 530 may require content for an application or process on end user device 530. When this requirement occurs, end user device 530 contacts control node 510 using IP address 541, which is a shared IP address for all CNs connected to the control node. Once the content request arrives, control node 510 maps a connection between end user device 510 and one of the CNs 520-522. This connection may be defined by at least a network address end user device, IP address 540, and a virtual next hop network address, which comprises a virtual destination IP address, next hop A. Using the present example, next hop A is first associated with address A in MAC addresses 555. Accordingly, CN 520 initially handles the content requests for end user device 530.

Although configured to handle the entire content request by end user device 530, the communication with CN 520 may be interrupted in some examples. This interruption may occur due to an issue on CN 520, an issue with the path between control node 510 and CN 520, or for any other reason. Responsive to detecting an interruption in the communication with CN 520, control node 510 may modify the communication path for the end user device. Again referring to the present example, next hop A is reconfigured to be directed to MAC address Z in MAC address 555. This new MAC address allows end user device 530 to communicate with CN 522 during the interruption of CN 520.

In some examples, CNs 520-522 may use the MAC addresses to identify the type of communication from the incoming end user devices. For example, using CN 522, when all CNs are executing properly, CN 522 may receive communications from end user devices using one or more normal MAC addresses on control node 510. However, as a CN is interrupted, such as CN 520, other special MAC addresses may be used to identify that communications are being passed or "drained" from the CN with an issue. This allows CN 522 to attempt to sync the communication with the draining devices, reject the communication from the incoming devices, or redirect the communication of the incoming devices. In some instances, the special MAC addresses include one or more digits that are used to define information about the communication. Such information may include an identifier of the original CN, an identifier of the current CN, as well as other information that could be useful in identifying the type of communication.

Although not illustrated in the present example, MAC addresses 555 could be further updated when all of the end user devices have been directed to other CNs. Accordingly, address Z may be used during the draining period, however, address Z may be modified into a different address to notify CN 522 that no further transitioning devices should be expected.

Figure 6:
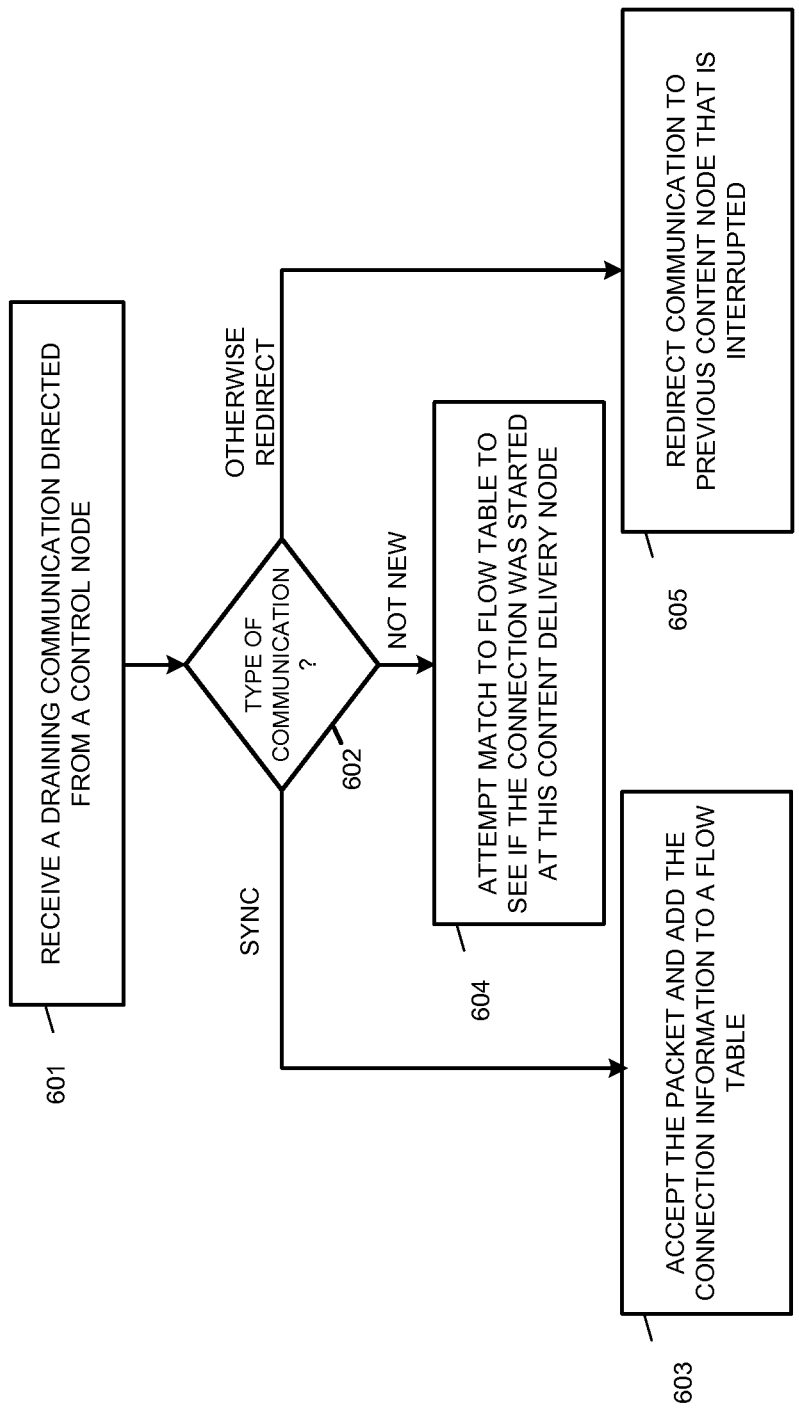
FIG. 6 illustrates an operation of a content node during a content node interruption.

To further describe the operation of a content delivery node during the draining process, FIG. 6 is provided. FIG. 6 illustrates an operation of a content delivery node during a content node interruption. The operation of FIG. 6 is described parenthetically in the description below.

In operation, one or more CNs are communicatively connected to a control node that directs content requests from end user devices to the CNs. To provide the content, virtual next hop network addresses are employed within the control node to direct the communications between the end user devices and the appropriate CN. These virtual next hop addresses may comprise virtual IP network addresses that are mapped using a table or some other data structure to MAC addresses associated with the various CNs.

Under normal operation, the MAC addresses direct the requests to each of the CNs and the CNs respond with the requested data. However, for any number of reasons, one or more CNs connected to the control node may fail or have the connection interrupted with the control node. As a result, the control node is configured to "drain" or redirect the communications to the still available CNs.

As illustrated, a remaining CN is configured to receive a draining communication from a control node (601). In some examples, to identify the draining communication, the CN identifies the MAC address that was used for the communication. For instance, if two CNs are connected to a control node they may each have one or more normal MAC addresses that are used when neither CN is interrupted. However, when a CN is interrupted, the control node may direct the communications using special "draining" MAC addresses that indicate that the communication is from the alternative CN.

Responsively, the CN identifies the type of communication for the draining communication (602). If the draining communication includes a synchronization packet, then the CN accepts the packet and adds the connection information to a flow table that is stored on the CN (603). If the draining communication does not include the synchronization packet, then the node attempts to match the communication to the flow table to see if the connection was started at this CN (604). Otherwise, the CN redirects the draining communication to the CN with the original MAC address for the communication (605). For example, a communication may not include a synchronization packet or have been started on the present CN. Accordingly, the CN redirects the communication to the CN at the original MAC address for the communication.

Figure 7:
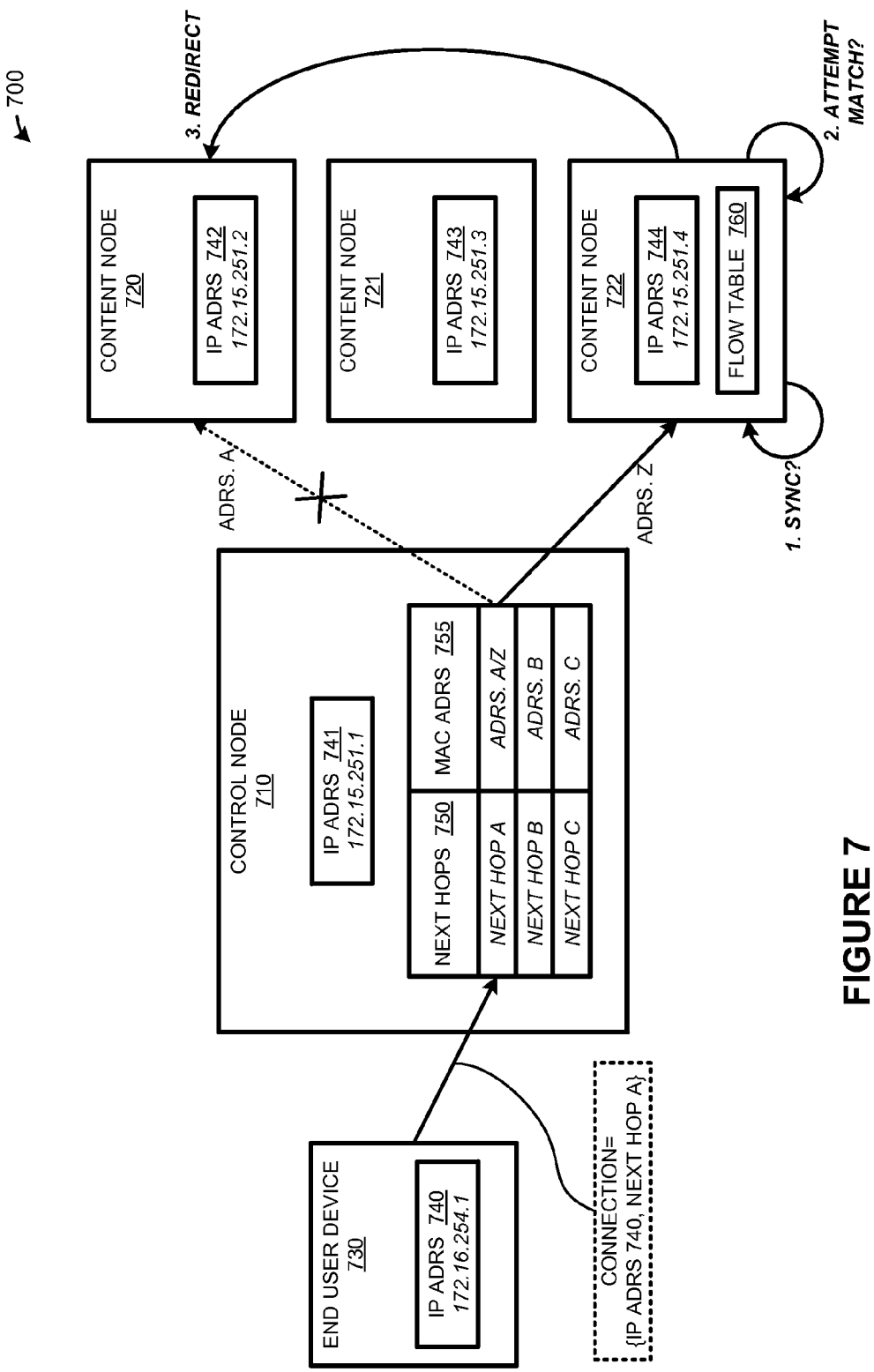
FIG. 7 illustrates an overview of operating a content node during a failover from another content node.

Turning to FIG. 7, FIG. 7 illustrates an overview 700 of operating a content node during a failover from another content node. Overview 700 includes control node 710, content nodes (CNs) 720-722, and end user device 730, which each includes IP addresses 740-744. Control node 710 further includes next hop network addresses 750, which correspond MAC addresses 755. CN 722 further includes flow table 760 to manage the connections with the end user devices.

In operation, end user device 730 initiates a content request to control node 710. Once the content request is identified by control node 710, the request is mapped to one of CNs 720-722 using virtual next hop network addresses 750. These virtual addresses are fake or fabricated by control node 710 to establish a connection, but allow the connection to be routed to the various CNs. For example, as illustrated, end user device 730 establishes a communication with next hop network address A in next hop network addresses 750. However, the communication is not directed to this next hop network address, as the destination does not exist. Instead, the next hop network address is mapped to a MAC network address in MAC addresses 755. Once the MAC address is identified, the content request is directed to the corresponding CN associated with the MAC address. In the present example, the initial MAC address for the content request is address A. Thus, CN 720 is configured to respond to the content requests of end user device 730.

Although CN 720 may provide all of the content necessary for end user device 730 under normal conditions, in some examples, an interruption may occur between control node 710 and CN 720. This interruption may occur as a result of a communication link failure between control node 710 and CN 720, may occur as a result of a failure of CN 720, or any other similar interruption between control node 710 and CN 720. In some examples, CNs 720-722 are configured to transfer status updates to control node 710, however, in other examples, control node 710 may periodically query CNs 720-722 to determine the availability of the nodes.

Once an interruption is determined in the communication path between control node 710 and CN 720, control node 710 is configured to "drain" or transfer the communications from CN 720 to another communicatively coupled CN. In the present instance, for end user device 730, next hop A within next hop network addresses 750 transitions to being associated with address Z in MAC addresses 755. Accordingly, rather than being directed to CN 720, end user device 730 will be directed to CN 722.

Based on MAC address Z, CN 722 identifies that the communication from end user device 730 is a draining communication from another content delivery node. Accordingly, CN 722 attempts to identify if the communication contains a synchronization message, which would allow the communication from end user device 730 to be added to CN 722 and flow table 760. However, if no synchronization message is included, CN 722 may attempt to match the communication from end user device 730 to a communication that is already initiated on the CN, and handle the communication based on the matching. These previously initiated communications may appear within flow table 760, which manages the communications that are handled by the CN. If the flow table is searched and the communication cannot be identified, control node 722 may then redirect the communication to the original CN 720 to allow the original CN to handle the content request for end user device 730.

Although illustrated in the present example with three CNs, it should be understood that control node 710 might communicate with any number of CNs to direct content requests.

Turning to FIG. 8, FIG. 8 illustrates a flow table 800 for a content node. Flow table 800 includes source address 810, destination address 820, source port 830, destination port 840, and other information 850. Other information 850 may include the protocol for the communication, a data unit count, a time stamp field, or other similar information. Although illustrated in the present example with five columns, it should be understood that flow table 800 might contain additional, fewer, or different fields. In some examples, source address 810 may be the IP address for the end user device making the communication, and destination address 820 may be the virtual next hop network address used in the communication for the end user device.

In operation, CNs are configured to receive content requests from various end user devices. As the requests are received, the communications may be logged into flow table 800 to maintain and keep track of the various connecting devices. In the present example, when another CN fails, the replacement CN is configured to identify communications that are drained from the failed CN. Once a draining communication is identified, the replacement CN attempts to identify a synchronization message in the communication. If a synchronization message is included then the new communication is added to flow table 800. If, however, a synchronization code is not present, then the replacement CN attempts to match the communication with a communication that has previously been logged in table 800 to determine how to handle the communication. If the communication is logged in table 800, then the replacement CN accepts the communication. In contrast, if the communication is not in table 800 then the communication is routed back to the failed CN using the appropriate MAC address for the node.

Figure 9:
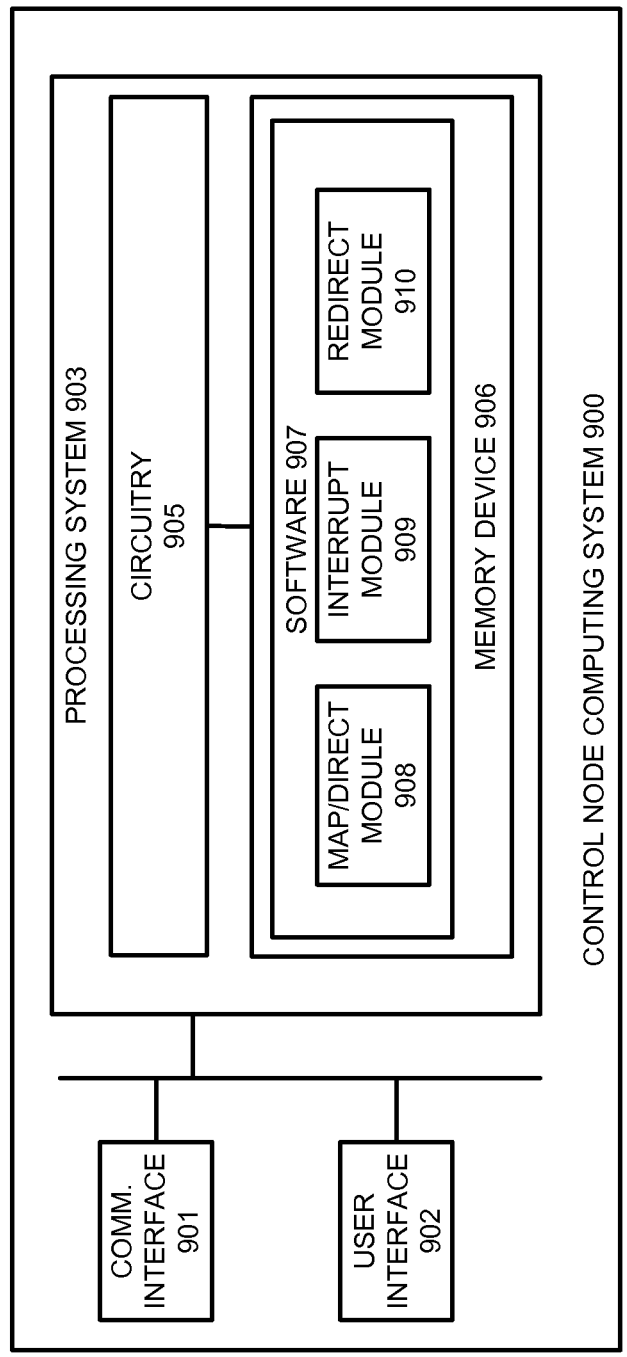
FIG. 9 illustrates a control node computing system for handling content node interruptions.

Referring now to FIG. 9, FIG. 9 illustrates a control node computing system 900 for handling control node interruptions. Control node computing system 900 is an example of control nodes 130, 310, 510, and 710, although other examples may exist. Control node computing system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof. Here, communication interface 901 communicates with one or more CNs that are used to provide content for end user devices, and further communicates with the requesting end user devices. Accordingly, computing system 900 acts as a switch or intermediary between the CNs and the requesting devices.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes map/direct module 908, interrupt module 909, and redirect module 910. Operating software 907 may further include an operating system, utilities, drivers, network interfaces, applications, or some other type of software. When executed by circuitry 905, operating software 907 directs processing system 903 to operate control node computing system 900 as described herein.

In particular, communication interface 901 receives content requests from various end user devices requesting content from communicatively coupled CNs. Once a request is received, map/direct module 908 maps a first connection between the end user device an a first CN, wherein the first connection is defined by at least a network address of the end user device and a virtual next hop address. In some examples, computing system 900 includes an ARP table, which is used to balance the mapping of end user devices to corresponding CNs. Once a connection is mapped for the end user device, map/direct module 908 directs traffic associated with the first connection to the first CN using at least a virtual next hop network address from the ARP table.

While directing the communications, interrupt module 909 identifies an interruption in the communication between control node computing system 900 and the first CN. This interruption may occur as a result of a failure of the communication link, as a result of a failure within the CN itself, or any other possible interruption between the computing system 900 and the first CN. Responsive to identifying the interruption, redirect module 910 identifies a second CN to handle the first connection and directs the traffic associated with the first connection to the second CN using at least the virtual next hop network address.

In some instances, the virtual next hop network addresses within the ARP table do not correspond to any physical device, but are instead associated with MAC addresses that actually correspond to the various CNs. As a result, the virtual next hop network addresses are a different IP address than the CNs they virtually represent.

Figure 10:
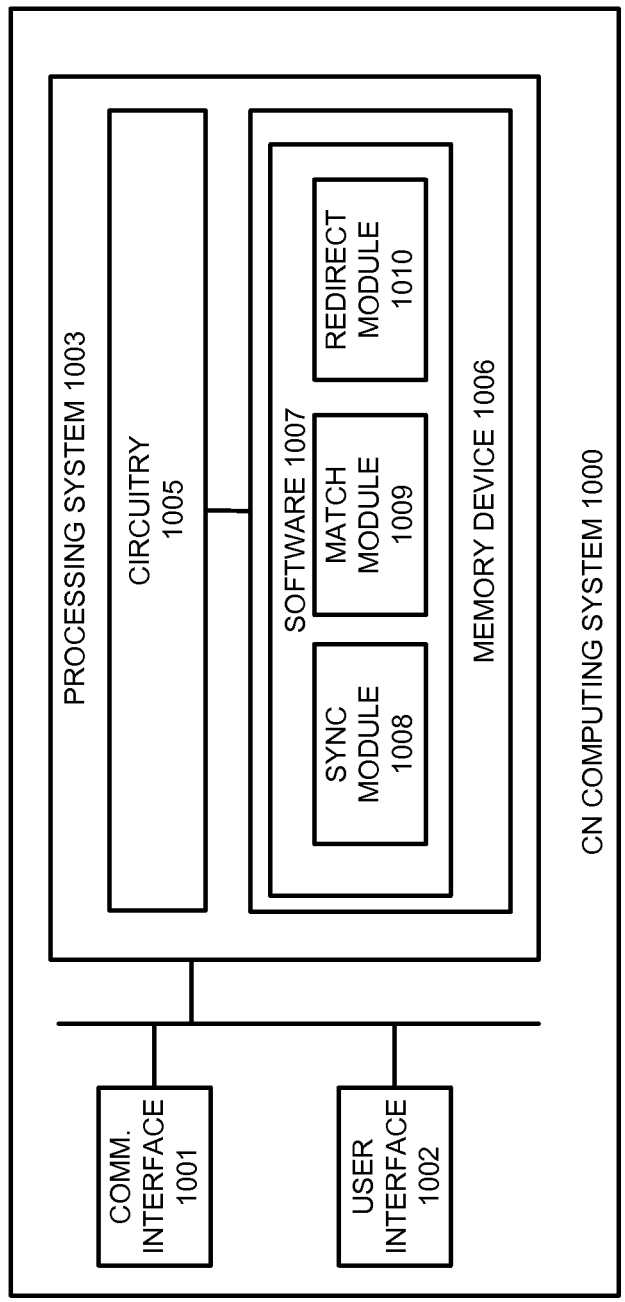
FIG. 10 illustrates a content node computing system for handling data communications from an interrupted content node.

Referring now to FIG. 10, FIG. 10 illustrates a content node (CN) computing system 1000 for handling data communications from an interrupted CN. CN computing system 1000 is an example of CNs 120-123, 320-321, 520-522, and 720-722, although other examples may exist. CN computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof. Communication interface 1001 communicates with at least one control node to receive and respond to content requests from end user devices.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes synchronization module 1008, match module 1009, and redirect module 1010. Operating software 1007 may further include an operating system, utilities, drivers, network interfaces, applications, or some other type of software. When executed by circuitry 1005, operating software 1007 directs processing system 1003 to operate CN computing system 1000 as described herein.

Specifically, communication interface 1001 receives a draining communication from a control node. This draining communication may be identified by the MAC address that was used to communicate with computing system 1000. In response to the draining communication, synchronization module 1008 identifies if a synchronization message is included in the communication. If a synchronization message is included, the communication is added to a flow table that is used manage the connections with the communication. If a synchronization message is not included, match module 1009 attempts to match the communication to a prior communication that was initiated in computing system 1000. If a match is found then the communication is processed using computing system 1000, however, if a match is not found the communication is redirected to the original CN for the communication.

For example, a content communication may initiate with an original MAC address for a first CN. However, if the first CN fails, the MAC address may be changed to move the communication to a second CN. Once the communication arrives at the second CN, and does not include a synchronization message or match to a communication on the second node, the communication is forwarded to the original MAC address.

Although illustrated in the present example with three software modules for both control node computing system 900 and CN computing system 1000, it should be understood that any number of software modules might provide the same functionality.

Figure 11:
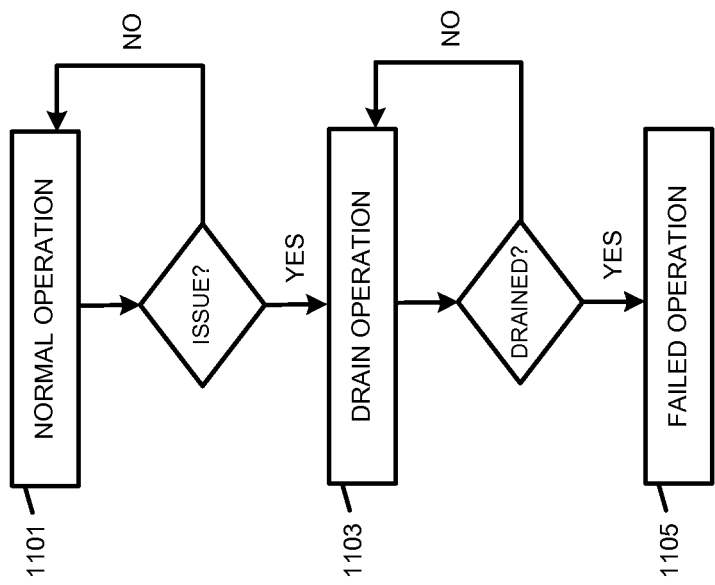
FIG. 11 illustrates a flow diagram for operating a control node to direct communications to content nodes in a content delivery network.

FIG. 11 illustrates a flow diagram for operating a control node to direct communications to content nodes in a content delivery network. As depicted, the control node initially starts in normal operation 1101. Normal operation 1101 allows the control node to receive content requests from end user devices and distribute the requests amongst the CNs communicatively coupled to the control node. In addition to directing communications, the control node is further configured to identify issues with the various CNs. If an issue is not present, the control node will continue in normal operation 1101. However, if an issue is present with a content delivery node, the control node will initiate drain operation 1103 to transfer communications from the problematic node to the one or more remaining nodes.

In some examples, the draining process may be accomplished using at least virtual next hop network addresses and MAC addresses in an ARP table. During normal operation 1101, communications are configured for an end user device using the IP address for the end user device and a virtual next hop network address that is mapped on the control node. In turn, the virtual next hop network address is associated via a table, such as ARP table 400 or some other data structure, to a MAC address for a CN. Accordingly, when one of the CNs fails, the MAC addresses to the failed CN may need to be modified to direct communications to alternative CNs. In some instances, the MAC address may include information, such as an identifier for the current CN, an identifier for the original CN, or any other related information about the communication. Thus, during drain operation 1103, the current CN portion of the MAC addresses may be modified to a remaining CN.

Once all of the communications have been drained or transferred to alternative CNs, the control node may transfer to failed operation 1105. This new operation may again modify the MAC addresses in the ARP table to notify the remaining CNs that all communications have been transferred and they no longer need to look for draining communications from problematic CN.

Although not illustrated in the present example, it should be understood that at any point the control node might identify that the problematic CN has returned to being available. As such, the control node may again route communications to the problematic CN to balance the content request load. Further, although illustrated in FIGS. 1-11 using special MAC addresses to route communications from the control node to the various CNs, it should be understood that any similar link layer protocol addressing scheme may be used by the control node.

Returning to the elements of FIG. 1, CNs 120-123 each comprise one or more devices capable of caching and providing content to end user devices. Each CN 120-123 may include processing systems, storage systems, user interfaces, communication interfaces, power supplies, or any other computer related systems. Examples of CNs 120-123 include server computers, desktop computers, laptop computers, or other similar computing devices.

Control node 130 comprises one or more devices capable of directing communications between CNs 120-123 and end user devices 140-142. Control node 130 may include processing systems, storage systems, user interfaces, communication interfaces, power supplies, or any other computer related systems. Examples of control node 130 include server computers, desktop computers, laptop computers, or other similar computing devices.

Origin servers 150-152 each comprise one or more devices capable of caching and providing content to end user devices. Each CN 120-123 may include processing systems, storage systems, user interfaces, communication interfaces, power supplies, or any other computer related systems. Examples of CNs 120-123 include server computers, desktop computers, laptop computers, or other similar computing devices.

End user devices 140-142 each represent a computing device capable of requesting content from CNs 120-123. End user device 140-142 may each include processing systems, storage systems, user interfaces, communication interfaces, power supplies, or any other computer related systems. End user devices 140-142 may each represent a telephone, tablet, computer, e-book, mobile Internet appliance, wireless network interface card, media player, game console, or some other end user computing apparatus.

Communication links 160-165 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 160-165 could be direct links or may include intermediate networks, systems, or devices.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein can be in the form of a functional diagram, operational sequence, or flow diagram, and can be described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above.

What is claimed is:

1. A method of operating a content node in a content delivery system to handle communications transitioned from an interrupted content node, the method comprising:
   receiving a communication from a control node, the communication corresponding to a content request issued by an end user device previously handled by the interrupted content node;
   determining if the communication includes a synchronization packet and identifying connection information for the communication;
   if the communication includes the synchronization packet, accepting the communication, adding the connection information for the communication to a flow table, and handling content delivery for the end user device instead of the interrupted content node based at least on the flow table; and
   if the communication does not include the synchronization packet, determining if a match exists between the connection information for the communication and connection information stored in the flow table, and handling the communication based on the match.

2. The method of claim 1 wherein handling the communication based on the match comprises:
   if the match exists, handling content delivery for the end user device instead of the interrupted content node based at least on the flow table; and
   if the match does not exist, forwarding the communication to the interrupted content node.

3. The method of claim 2 wherein receiving the communication from the control node comprises receiving the communication from the control node using a media access control (MAC) address.

4. The method of claim 3 wherein the MAC address comprises at least an encoded identifier for the content node and an encoded identifier for the interrupted content node.

5. The method of claim 4 wherein forwarding the communication to the interrupted content node comprises forwarding the communication to the interrupted content node based on the encoded identifier for the interrupted content node.

6. The method of claim 1 wherein the flow table comprises at least a source network address, a destination network address, a source port identifier, and a destination port identifier.

7. The method of claim 6 wherein the destination network address comprises a virtual next hop network address.

8. A computer apparatus to operate a content node in a content delivery network, the computer apparatus comprising:
processing instructions that direct the content node, when executed by the content node, to:
receive a communication from a control node, the communication corresponding to a content request issued by an end user device previously handled by the interrupted content node;
determine if the communication includes a synchronization packet and identify connection information for the communication;
if the communication includes the synchronization packet, accept the communication, add the connection information for the communication to a flow table, and handle content delivery for the end user device instead of the interrupted content node based at least on the flow table; and
if the communication does not include the synchronization packet, determine if a match exists between the connection information for the communication and connection information stored in the flow table, and handling the communication based on the match; and
one or more non-transitory computer readable media that store the processing instructions.

9. The computer apparatus of claim 8 wherein the processing instructions to handle the communication based on the match direct the content node to:
if the match exists, handle content delivery for the end user device instead of the interrupted content node based at least on the flow table; and
if the match does not exist, forward the communication to the interrupted content node.

10. The computer apparatus of claim 9 wherein the processing instructions to receive the communication from the control node direct the content node to receive the communication from the control node using a media access control (MAC) address.

11. The computer apparatus of claim 10 wherein the MAC address comprises at least an encoded identifier for the content node, and an encoded identifier for the interrupted content node.

12. The method of claim 11 wherein the processing instructions to forward the communication to the interrupted content node direct the content node to forward the communication to the interrupted content node based on the encoded identifier for the interrupted content node.

13. The computer apparatus of claim 8 wherein the flow table comprises at least a source network address and a destination network address.

14. The computer apparatus of claim 13 wherein the destination network address comprises a virtual next hop network address.

15. A content delivery network to transition communications to a content node from an interrupted content node, the system comprising:
a control node configured to:
transfer a communication to a content node, the communication corresponding to a content request issued by an end user device previously handled by the interrupted content node; and
the content node configured to:
receive the communication;
determine if the communication includes a synchronization packet and identify connection information for the communication;
if the communication includes the synchronization packet, accept the communication, add the connection information for the communication to a flow table, and handle content delivery for the end user device instead of the interrupted content node based at least on the flow table; and
if the communication does not include the synchronization packet, determine if a match exists between the connection information for the communication and connection information stored in the flow table, and handling the communication based on the match.

16. The content delivery network of claim 15 wherein the content node is further configured to:
if the match exists, handle content delivery for the end user device instead of the interrupted content node based at least on the flow table; and
if the match does not exist, forward the communication to the interrupted content node.

17. The content delivery network of claim 16 wherein the content node configured to receive the communication from the control node is configured to receive the communication from the control node using a media access control (MAC) address.

18. The content delivery network of claim 17 wherein the MAC address comprises at least an encoded identifier for the content node, and an encoded identifier for the interrupted content node.

19. The content delivery network of claim 18 wherein the content node configured to forward the communication to the interrupted content node is configured to forward the communication to the interrupted content node based on the encoded identifier for the interrupted content node.

20. The content delivery network of claim 15 wherein the flow table comprises at least a source network address and a destination network address, and wherein the destination network address comprises a virtual next hop network address.

* * * * *